United States Patent [19]

Satzler

[11] Patent Number: 5,989,142
[45] Date of Patent: Nov. 23, 1999

[54] PLANETARY STEERING DIFFERENTIAL

[75] Inventor: Ronald L. Satzler, Princeville, Ill.

[73] Assignee: Caterpillar Inc., Peoria, Ill.

[21] Appl. No.: 09/067,104

[22] Filed: Apr. 27, 1998

[51] Int. Cl.$^6$ .................................................. F16H 1/42
[52] U.S. Cl. ........................... 475/150; 475/18; 475/221
[58] Field of Search ........................... 475/18, 22, 12, 475/28, 221, 225, 150

[56] References Cited

U.S. PATENT DOCUMENTS

| | | | |
|---|---|---|---|
| 2,730,182 | 1/1956 | Sloane | 74/18 X |
| 3,034,322 | 5/1962 | Miller | 74/89 X |
| 3,373,636 | 3/1968 | Livezey et al. | 74/720.5 |
| 3,966,005 | 6/1976 | Binger | 180/6.44 |
| 4,174,762 | 11/1979 | Hopkins et al. | 180/6.44 |
| 4,331,208 | 5/1982 | Kolthoff et al. | 180/6.2 |
| 4,917,200 | 4/1990 | Lucius | 180/6.2 |
| 5,387,161 | 2/1995 | Shibata | 475/221 X |
| 5,509,491 | 4/1996 | Hall, III | 180/9.44 |
| 5,529,136 | 6/1996 | Zulu | 180/6.44 |
| 5,722,501 | 3/1998 | Finch et al. | 180/6.44 |

*Primary Examiner*—Khoi Q. Ta
*Attorney, Agent, or Firm*—Calvin E. Glastetter

[57] ABSTRACT

Continuously driven machine steering differentials have heretofore been complex for counter-rotating a pair of oppositely located planetary elements. The planetary steering differential includes a differential powered by a transmission input and a planetary gearing mechanism which receives an input from a steering motor for interacting with the outputs to achieve a steering correction.

9 Claims, 1 Drawing Sheet

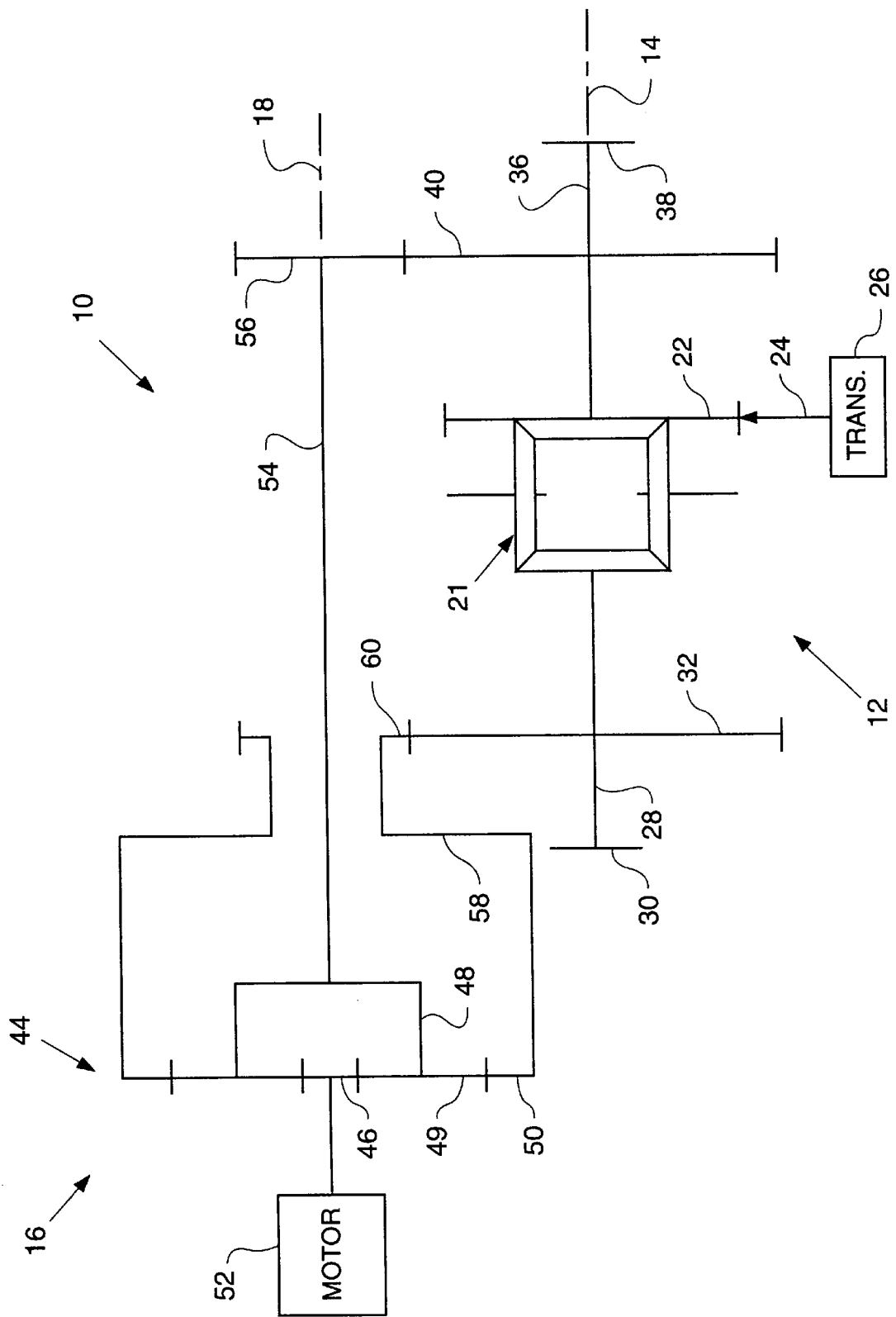

PLANETARY STEERING DIFFERENTIAL

TECHNICAL FIELD

This invention relates generally to a mechanism for a machine cross drive or the like, and more particularly to a compact and simplified planetary steering differential.

BACKGROUND ART

A large number of machines have been developed which have incorporated either clutch-and-brake steering mechanism or geared steering mechanism. In both of these classifications, however, the drive is discontinuous when making turns. This results in poorer operation of the vehicle than is desired during turns in marginal ground conditions.

Another major group of steering mechanism includes differential mechanisms in which drive is transmitted continuously to both traction elements. The simplest form thereof is a braked differential, but these are rarely used because of relatively large power losses at the steering brake.

Thus, what is desired is a compact steering differential having continuous drive capability to the opposite output members, a relatively simple arrangement having a single steering in power path.

The present invention is directed to overcoming one or more of the problems as set forth above.

DISCLOSURE OF THE INVENTION

In one aspect of the invention a planetary steering mechanism is driven by a transmission and a steering motor on a machine having a first traction element and a second traction element. The planetary steering mechanism is provided having a differential driven by the transmission. A first output member of the differential is provided for driving the first traction element. A second output member of the differential is provided for driving the second traction element. A planetary gearing mechanism is driven by the steering motor and includes a first element drivingly connected to the first member of the differential and a second element drivingly connected to the second member of the differential. The first and second elements are driven in opposite directions at the same speed in response to input from the steering motor to vary the speed of the first and second output members and the traction elements for steering the machine.

The present invention provides a compact planetary steering mechanism having continuous drive capability through the differential to the opposite output members along a first drive axis for driving the machine. When a steering correction is needed the steering motor is used to drive the planetary gearing mechanism for interacting with the output members to accomplish the steering correction.

BRIEF DESCRIPTION OF THE DRAWINGS

The sole drawing FIGURE is a diagrammatic illustration of the present invention showing in block form a steering motor input and a separate transmission input.

BEST MODE FOR CARRYING OUT THE INVENTION

Referring to the diagrammatic drawing, a planetary steering mechanism 10 is shown in simplified block-like form which has a differential mechanism 12 aligned along a first drive axis 14 and a planetary gearing mechanism 16 along a second dive axis 18 spaced parallel from the first axis 14.

The differential mechanism 12 includes a conventional spider gear differential 21 having an input gear 22 for receiving an input 24 from a transmission 26. A first output member 28 extends from the differential 12 to a first traction element 30 on the left side of a machine, not shown. A gear 32 is coupled to the first output member 28 and they are driven as a unit. A second output member 36 extends from the differential 12 to a second traction element 38 on the right side of the machine. A gear 40 is coupled to the second output member 36 and they are driven as a unit.

The planetary gear mechanism 16 includes a single planetary gear set 44 having a sun gear 46, a planet carrier 48 with planetary gears 49, and a ring gear 50. The sun gear 46 is drivingly connected to a steering motor 52. The carrier 48 is connected to shaft 54 having a gear 56 which is intermeshed with the gear 40 of the second output member 36. The ring gear 50 is connected to a element 58 having a gear 60 intermeshed with the gear 32 of the first output member 28.

INDUSTRIAL APPLICABILITY

In operation, the planetary steering mechanism 10 is situated to be used on a machine so that the axis 14 is substantially in line with, or near the axis of the traction elements 30,38. When the first and second outputs 28,36 are rotated in the same direction and at the same speed the machine will travel straight forward or reverse in a longitudinal direction. Either mode of operation is achieved by selecting the gear speed and direction of the output 24 of the transmission 26. In either straight direction the differential 21 will drive the output member 28,36 and the traction elements 30,38 in the same direction and at the same speed. In a straight direction the steering motor 52 is not driving the planetary gear mechanism 16 so that it and the associated gears are in a freewheeling mode.

To steer the machine, for example forward direction left turn, the differential continues to be powered by the transmission to rotate the outputs 28,36 and the steering motor 52 drives the planetary gearing mechanism 16. To achieve a left turn the sun gear 46 rotates in the opposite direction from the first output member 28 so that the output member 28 is forced to slow down and the second output member 36 is forced to speed up.

In a forward right turn the sun gear 46 is powered in the same direction as the first output 28 and the output member 36 is forced to slow down and the first output member is forced to speed up.

By establishing the number of teeth in the ring gear and the sun gear at preselected values certain advantages will accrue. This can best be appreciated by selectively establishing the ratio of the number of teeth of the ring gear element divided by the number of teeth of the sun gear element, hereinafter called e value. The ratio of the number of teeth in gear 60 divided by the number of teeth of gear 32 is called R1. The ratio of the number of teeth in gear 56 divided by the number of teeth in gear 40 is called R2. For the steering arrangement to function properly the ratio must be $$\frac{e}{e+1} = \frac{R1}{R2}.$$

It is recognized that the planetary gearing mechanism can be connected to the output members by sprockets and chains or other means without departing from the scope of the present invention.

Other aspects, objects and advantages of this invention can be obtained from a study of the drawing, the disclosure and the appended claims.

I claim:

1. A planetary steering mechanism adapted to be driven in use by a transmission and a steering motor on a machine having a first traction element and a second traction element, the planetary steering mechanism, comprising:

a differential aligned along a first drive axis and adapted to be driven by the transmission;

a first output member of the differential for driving the first traction element;

a second output member of the differential for driving the second traction element; and a planetary gearing mechanism aligned along a second drive axis and adapted to be driven by the steering motor, the planetary gearing mechanism having a first element drivingly connected to the first output member of the differential and a second element drivingly connected to the second output member of the differential, the first and second elements being driven in opposite directions in response to input from the steering motor to vary the speed of the first and second output members and the traction elements for steering the machine wherein the planetary gearing mechanism includes a single planetary gear set having a sun gear, a carrier with planet gears and a ring gear.

2. The planetary steering mechanism of claim 1, wherein the sun gear of the planetary gearing mechanism is drivingly connected to the steering motor.

3. The planetary steering mechanism of claim 1, wherein the carrier of the planetary gearing mechanism is drivingly connected to a gear of one of the output members.

4. The planetary steering mechanism of claim 1 wherein the ring gear of the planetary gearing mechanism is drivingly connected to a gear of the other one of the output members.

5. The planetary steering mechanism of claim 4 wherein a first gear of the planetary gearing mechanism is drivingly connected between the gear of the first output member and the ring gear and a second gear of the planetary gearing mechanism is drivingly connected between the gear of the second output member and the carrier.

6. The planetary steering mechanism of claim 5 wherein the number of teeth in the first gear divided by the number of teeth in the gear of the first output is a ratio of R1.

7. The planetary steering mechanism of claim 6 wherein the number of teeth in the second gear divided by the number of teeth in the gear of the second output is a ratio of R2.

8. The planetary steering mechanism of claim 7 wherein the number of teeth on the ring gear divided by the number of teeth on the sun gear establishes an e valve ratio.

9. The planetary steering mechanism of claim 8 wherein the ratio of the planetary gearing mechanism is $$\frac{e}{e+1} = \frac{R1}{R2}.$$

* * * * *